Dec. 9, 1952     B. K. O. LUNDBERG     2,620,622
REVERSE THRUST ARRANGEMENT FOR
BRAKING JET-PROPELLED AIRCRAFT
Filed Dec. 17, 1945     3 Sheets-Sheet 1
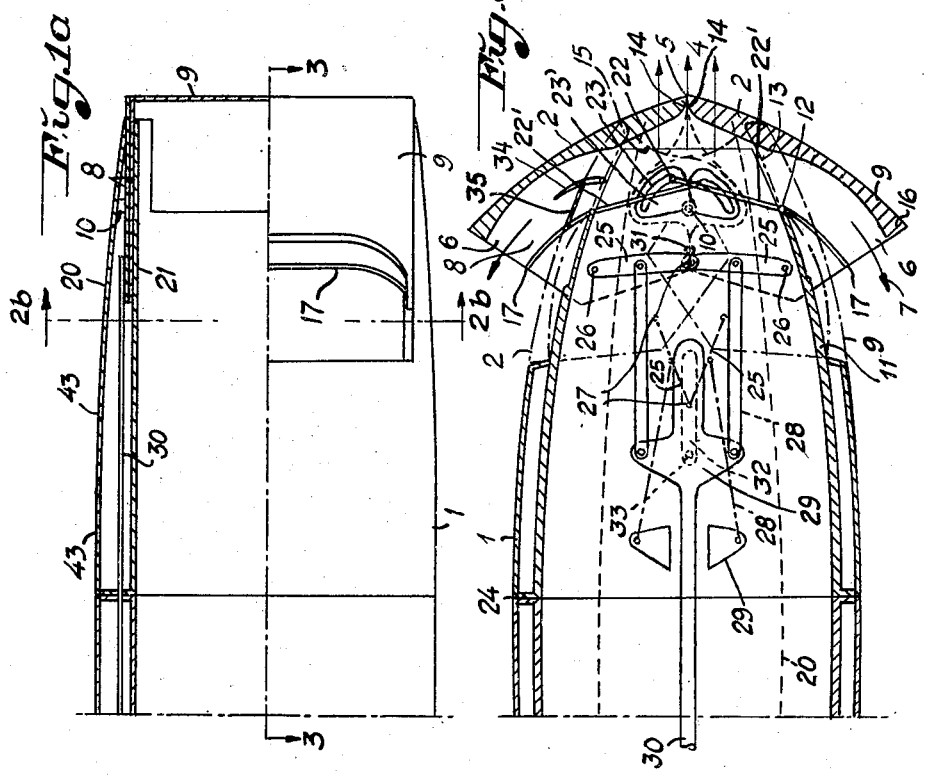
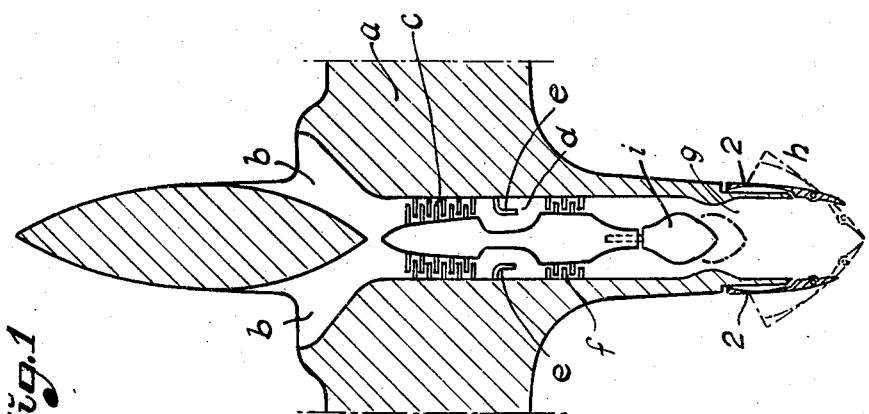
Inventor:
Bo Klas Oskar Lundberg,
by Pierce & Scheffler,
Attorneys.

Dec. 9, 1952        B. K. O. LUNDBERG        2,620,622
REVERSE THRUST ARRANGEMENT FOR
BRAKING JET-PROPELLED AIRCRAFT
Filed Dec. 17, 1945                          3 Sheets-Sheet 2
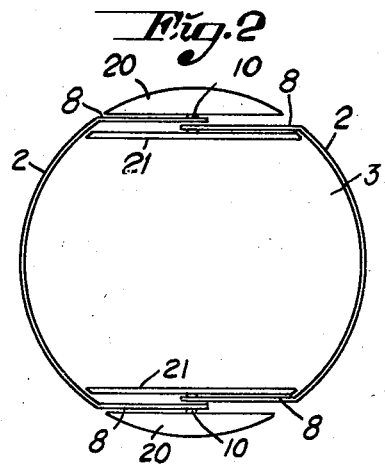
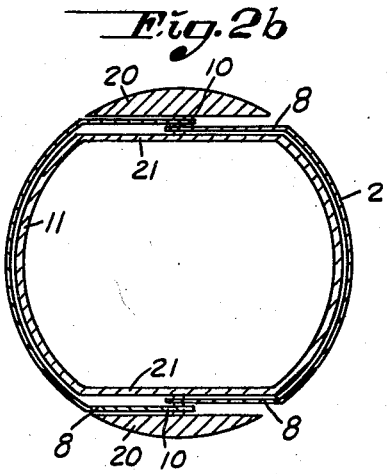
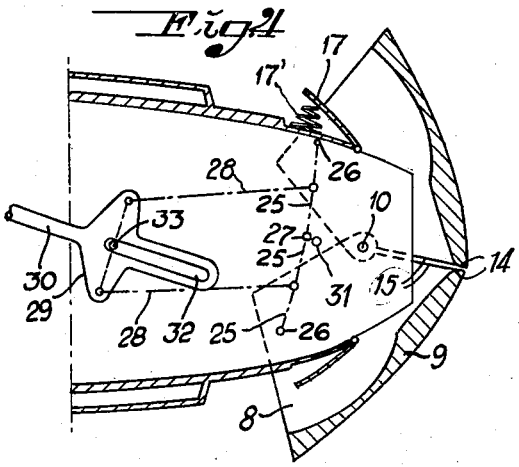
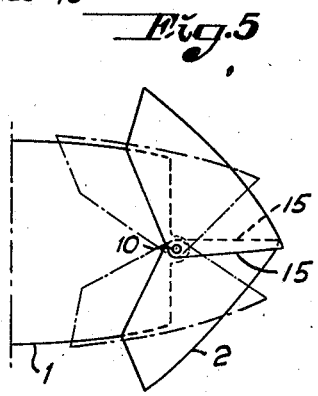
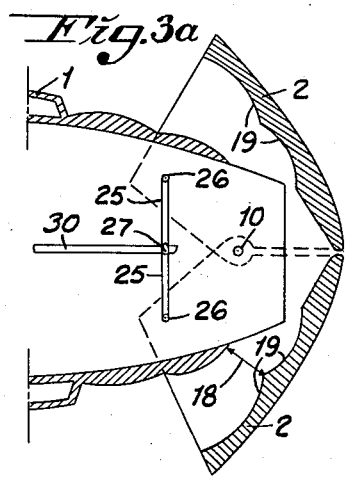
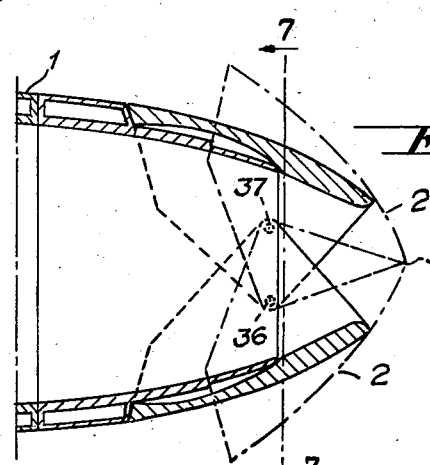
Inventor:
Bo Klas Oskar Lundberg,
by Pierce Scheffler,
Attorneys.

Dec. 9, 1952     B. K. O. LUNDBERG     2,620,622
REVERSE THRUST ARRANGEMENT FOR
BRAKING JET-PROPELLED AIRCRAFT
Filed Dec. 17, 1945     3 Sheets-Sheet 3
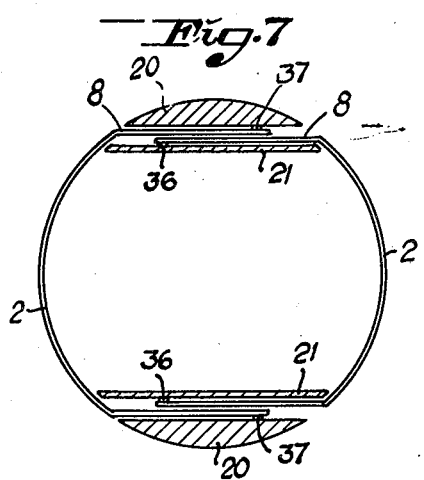
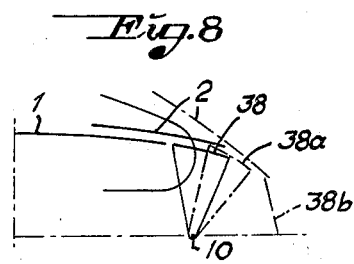
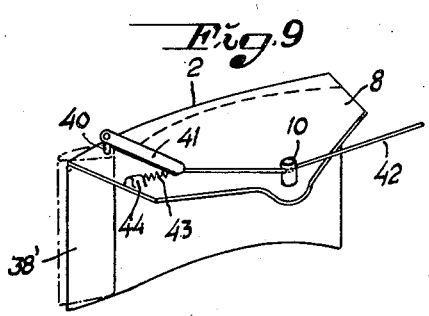
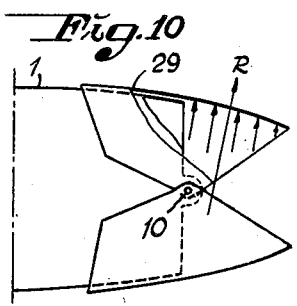
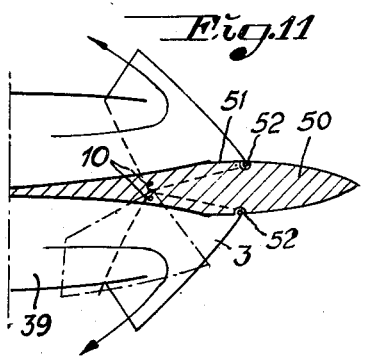
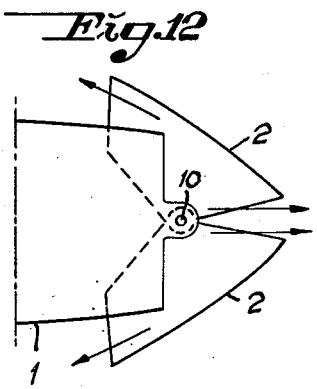
Inventor:
Bo Klas Oskar Lundberg,
by Pierce + Scheffler,
Attorneys.

Patented Dec. 9, 1952

2,620,622

UNITED STATES PATENT OFFICE 2,620,622

REVERSE THRUST ARRANGEMENT FOR BRAKING JET-PROPELLED AIRCRAFT

Bo Klas Oskar Lundberg, Appelviken, Sweden, assignor to Svenska Turbinfabriks Aktiebolaget Ljungstrom, Finspong, Sweden, a corporation of Sweden Application December 17, 1945, Serial No. 635,506
In Sweden May 12, 1945

9 Claims. (Cl. 60—35.55)

The tendency towards higher speed of flight has been accompanied by, and to a large degree been obtained by, continual increases in wing loading, resulting in higher landing and take-off speeds, which in turn require longer landing and take-off runs. A further increase in speed, which has become possible with the advent of jet or rocket propulsion, will be practical only if means of assistance for take-off and landing can be found, apart from wing flaps and the like. Otherwise, the size of aerodromes will have to be increased as the wing loading increases, which will cost enormous sums of money. As regards the problem of take-off, a sufficient shortening of the take-off run can be obtained by the use of a temporary increase of the tractive force during take-off, for instance by means of the recently developed rocket assistance. If the necessary landing run cannot be reduced to a length corresponding to the take-off, it will be a limiting factor on the wing loading and, in consequence, on the performance, unless very big and very expensive aerodromes are built.

The landing problem is largely a question of effectively reducing the speed of the aircraft immediately after touch-down. The braking devices known at present, such as various kinds of wheel brakes and air brakes, are not adequate for modern needs, especially in the case of high speed jet-propelled aircraft. Wheel brakes on heavy and high-speed aeroplanes involve expensive wear of tires, are more or less ineffective on slippery aerodromes, frozen surfaces during the winter, for example, and involve the risk of overturning in many cases, if they are applied forcibly. The retarding force which can be obtained by air brakes is too small to have significance on modern aeroplanes after touch-down, and as it is entirely dependent on the relative speed between the aeroplane and the air it can hardly prevent a dangerously long landing run if the wheel brakes should fail.

One object of the present invention is to provide an effective braking device in aircraft equipped with a jet propulsion unit, which braking device is substantially independent of the speed relative to the ground, and the use of which does not entail any risk of overturning.

A further object of the invention is to provide a deflecting device for the propulsive jet whereby said jet may be deflected with a view to reducing the propulsive effect thereof.

A still further object of the invention is to provide a deflecting device adapted in its operative position to guide or deflect the normally rearwardly directed reaction gases so that said gases will flow forwards or substantially forwards in the direction of flight, whereby a rearwardly or substantially rearwardly directed reactive force is obtained which acts braking on the aircraft. Although the braking force is intended principally for use after the wheels have touched the ground, it can be suitable in certain cases for application before touch-down or even during the approach. This reaction force can also be to advantage as a brake during flight if it is desirable to reduce the speed of the aircraft rapidly, for instance during or before the landing circuit, when flying in low visibility conditions and meeting an obstacle such as a mountain, when a fighter must reduce its speed to attack a slower moving enemy aircraft, when dive-bombing, and so on. The reaction brake can also be used to retard the aeroplane on the ground apart from during the landing run, for example during the take-off run if some defect renders continued take-off dangerous. In this case, the necessary length of runway required for safety can be reduced.

Another object of the invention is to provide a deflecting device by which the exhaust gases can be divided and diverted so as to flow in such a way that the net reaction force is null or nearly null (the vector sum of all reaction forces is null), in order that the reaction unit or units may develop full or substantially full power or revolutions per minute previous to starting, without other restraint than the wheel brakes or even without any restraint whatever. This would permit a better check of the safe functioning of the motors and would mean a shorter take-off as the maximum tractive force will be developed at the beginning of the run when, after the motors had attained full R. P. M., the deflecting mechanism is suddenly put out of operation, and the gases are allowed to flow rearwards. This is in contrast to the gradual increase of the reactive force which otherwise is obtained when the aircraft begins to move and the engines gradually develop the maximum tractive force.

Still another object of the invention is to improve the steering of the aeroplane on the ground or in the air. This is attained by controlling the deflecting mechanism so that a moment of force about the landing gear or about the centre of gravity is created in the horizontal plane by the exhausted reaction gases.

The most important versions of the invention are characterized by the location of the deflecting arrangement, when in operative position, wholly or partly behind the place where the exhaust gases normally are ejected or behind the most forwardly situated rear edges of the walls of the reaction aggregate proper. Another important characteristic is that the deflecting device is extendable and retractable, that is to say, from the extended working attitude it can be retracted when not in use into the propulsive unit or the extension of the same, or into some adjacent part of the aeroplane so that the device when not in function does not cause any appreciable additional drag.

The deflecting device can thus be attached to, or be a part of, the rearmost portion of the reaction unit, or the surrounding parts of the aeroplane covering. When in the extended position, the device or parts of it, will be situated more or less behind the retracted position. When extended, the deflecting device alone, or the device together with adjacent parts of the aeroplane or the reaction aggregate, close the passage of the exhaust gases backwards and at the same time direct the flow of the gases forwards, or obliquely forwards.

In the above mentioned, and other embodiments of the invention, the deflecting device can form, or consist of, one or more curved guide channels which in operative position are connected with the normal exhaust opening and thus divert the gases from a rearward direction of flow to some other direction, in general forwards.

Several embodiments of the invention are described below shown in the accompanying drawings.

Fig. 1 is a diagrammatic longitudinal section showing the central portion of an aircraft with a jet propulsion unit equipped with a deflecting device.

Fig. 1a is a side elevation with the top half in longitudinal section, showing the rear portion of the unit with the deflecting device.

Fig. 2 is a rear end view of the unit shown in Fig. 1a.

Fig. 2b is a transverse section on line 2b—2b in Fig. 1a.

Fig. 3 is a longitudinal section on line 3—3 in Fig. 1a.

Fig. 3a is a longitudinal part section illustrating a modified form of flaps of the deflecting device.

Fig. 4 is a view similar to Fig. 3 illustrating a slight modification and with the deflecting device in an unsymmetrical position.

Fig. 5 is a diagrammatic elevation illustrating a detail.

Fig. 6 is a longitudinal section similar to Fig. 3 and illustrating a modification.

Fig. 7 is a transverse section on line 7—7 in Fig. 6.

Fig. 8 is a diagrammatic sectional view of a further modification.

Fig. 9 is a perspective view illustrating a detail of operation means.

Fig. 10 is a diagrammatic sectional view illustrating a special feature.

Fig. 11 is a diagrammatic longitudinal section illustrating an embodiment having two units.

Fig. 12 is a diagrammatic longitudinal section illustrating an intermediate position of the deflecting device.

In the drawings Fig. 1 illustrates the central part of an airplane $a$ equipped with a jet propulsion unit comprising air inlets $b$, a rotary compressor $c$ receiving the air from the inlets $b$, a combustion chamber $d$ with fuel nozzles $e$, a turbine $f$ driven by the combustion gases and driving the compressor $c$, and an outlet tube or passage $g$. The rear end of the tube of $g$ has a deflection device $h$ for deflecting the propulsive gases to reduce the propulsive force and for braking purpose. The device is shown by full lines in a normal or retracted position and by dot-dashed lines in a fully extended or deflecting position.

Reference numeral 1 in Figs. 1a–3 denotes the rear part of the jet propulsion unit or its extension backwards. In this embodiment, the deflecting device comprises two movable wall portions or flaps 2, which are shown in the extended or deflecting position by full lines, and in the retracted position by dot-dashed lines in Fig. 3. When the device is retracted the reaction gases flow out through the normal outlet opening 3 (Fig. 2) as shown by the arrows 4 in Fig. 3. When the deflectors or flaps are extended to their operative or deflecting positions, the two flaps meet at 5 and close the normal exhaust opening and at the same time form two new exhaust openings 6 directed substantially forwards, one on each side of the aggregate, through which openings 6 the gases are forced to flow as shown by arrows 7. Each flap consists of two plane or curved plates 8 attached to a cap 9, which when the device is not in use forms part of the outer wall of the unit or part of the external skin. When in the extended position the plates 8 forms side walls of the passages for the exhaust gases.

The deflectors or flaps are pivotally mounted on a common pivot 10 at or near the plane of symmetry of the unit with bearings in the side plates 8, the flaps being thus carired by each of the two narrower sides of the aggregate, which are parallel to the plane in which the gases are deflected. Each of these narrower sides includes the stationary walls 20, 21 on each side of the side plates 8, and in these walls the pivot is attached. The two flaps can be rotated rearwards and inwards from the retracted position and in the opposite direction to the extended position.

As is shown in Fig. 3, the cap 9 in its retracted position partly covers the fixed inner wall 11 of the unit or its rear extension tube. The walls are thus double between the forward edge of the cap and the rear edge 12 of the fixed inner wall. Behind this rear edge the rear part of the cap forms a backward extension of the unit or aggregate wall, and the inside 13 of the cap should be made to form a smooth and continuous extension of the fixed inner wall 11. The caps include, or are fixed to, parts of the inner wall 13 of the normal exhaust opening, and when the device is extended, i. e. in operative position, the gases pass wholly or partly through the space which the said parts of the walls occupy when the device is retracted. Consequently, the outer walls when retracted extend further backwards than the fixed inner walls.

The outlet nozzle 3 of the aggregate is flattened somewhat from the circular cross section into a substantially rectangular shape. Due to the oblong shape of the nozzle, which also may be oval or elliptical, and due to the shortened distance between the rear edges 14 (Figs. 3, 4 and 5) of the two caps, the turning movements of the flaps from retracted into extended position become shorter than in the case of a square or circular outlet nozzle. According to the embodiment shown, the opposite edges of the normal outlet opening of the aggregate are straight and parallel to each other. As a result thereof, said edges will meet each other in extended position and prevent rearward flow of reaction gases. For the same purpose, the plates 8 of the flaps have such a shape that their free rearward edges 15 not connected to the caps will join each other or tighten against each other, for instance by overlapping each other in their extended positions, as illustrated in Fig. 5.

As will be seen from Fig. 3, the forward edges 16 of the caps are thickened so as to give the outlet passages a suitable shape and direction. Due to the increased thickness in the direction of flight, the gas jets will assume a more forwardly directed flow than if the direction of flow were defined by the shape of the outer sides of the caps. In the retracted position, the thickened portion which, of course, may be constituted by double walls, is sunk into a corresponding recess in the fixed wall 11.

In operative position, the deflecting device constitutes a bottom which in the embodiment shown is double-curved, since the forward circular section of the aggregate gradually merges into a rectangular shape. This bottom may alternatively be curved in one plane only or consist of parts curved in single planes. It is a characteristic feature that the bottoms partly extend outside the normal outlet opening of the aggregate as viewed in the projection according to Fig. 2. Further, the front edge of each bottom is located ahead of the normal outlet opening and, in the embodiment shown, also ahead of the rearward edges 12 of the fixed walls of the aggregate.

The deflecting device may also comprise edge flaps 17 which are preferably pivotally mounted at the rearward edges 12 of the fixed walls of the aggregate. Said edge flaps can be swung from a position at or near the fixed walls into an obliquely forwardly directed position in which they constitute inner walls for the curved outlet passages. The edge flaps have, inter alia, for their purpose to prevent, wholly or to a large degree, the gases from flowing along the outside of the aggregate. By means of the edge flaps or by other suitable means, the outlet opening of the deflecting device can in operative position be given such a small cross sectional area that the gases will be throttled as they pass through said opening. As illustrated in Fig. 3, the edge flap and the cap 9 can be shaped and located in such a manner that the passage formed thereby gradually decreases in cross section so that the gases will be gradually throttled as they flow towards the outlet. Alternatively, the cross section of the outlet may be increased from a minimum value, as indicated at 18, to a greater value at the outlet opening, such shape being suitable at supercritical gas velocity. This can be attained by shaping one or more walls of the passage such as generally indicated by the lines 19 in Fig. 3a. Generally speaking, the shape and direction of the edge flaps should be such that the passages formed by the edge 6 and the deflecting device proper will vary as to cross-sectional area at right angles to the direction of flow so as to obtain the desired throttling and pressure conditions. The edge flaps may be controllable and adjustable in different positions, in order that the degree of throttling and the direction of flow can be varied at will. The throttle area should be sufficiently large for function and control of the turbine.

The edge flaps may be positively actuated in response to the movement of the deflecting device, for instance as indicated in Fig. 3, by means of pins 22 which are guided in slots 23 provided in movable plates 23' pivoted to the axis 10 of the deflecting member 2. Each pin 22 may be secured to an arm 22' which is fixed to edge flap 17. The slots 23 are of such form and length that the edge flaps are moved into the desired extended position on rotation of the plates 23' at the movement of the deflectors 2 or will assume intermediate positions at intermediate positions of the deflectors 2. The edge flaps may be acted upon by resilient means such as springs 17' in Fig. 4 tending to swing outwards the flaps in a manner such that the flaps will be automatically opened when the other deflector portions are extended and will be closed by said portions when the same are retracted. In order to facilitate the mounting of the edge flaps at the pivots 12, the rear edges of the fixed wall portions may be straight and even parallel to each other as shown in Fig. 1a so as to prevent or substantially to prevent leakage between the edge flaps and said walls.

The aircraft may be provided with an adjustable conical member or the like such as i in Fig. 1 for controlling the degree of throttling of the gases during their rearward discharge.

It may sometimes prove suitable to construct the deflecting device and the rear portion of the aggregate or its extension as a separate unit connected to the aggregate at the joint 24 (Fig. 3) and easily removable therefrom. The said unit may be constructed in such a manner that it can be attached to aggregates which are not provided with deflecting devices, in which case said unit may be adapted to replace the corresponding rear portion of the aggregate.

The control of the deflecting device may be effected by means of a link system, for instance of the type indicated in Figs. 3 and 4. Such a link system may be provided on one side or on either side of the aggregate. In the former case, it comprises two links or arms 25 which at one end 26 are pivotally connected with the plates and at the other end 27 are pivotally secured to each other. By means of two rods 28, the links are connected with a transverse arm 29 rigidly secured to a control lever 30. In the extended position, the links 25 are placed substantially in a straight line or somewhat beyond the centre and abut against a stop member 31 secured to the fixed wall 21. Due to this arrangement, the deflecting device cannot be opened, for instance at 5, as a result of the inner gas pressure. In order to retract the deflecting device, a pull is exerted on the control lever 30 until the link system is moved into the position indicated diagrammatically by dash and dot lines. During this control movement, the control lever 30 may be guided by a slot 32 in an elongated portion of the lever, said slot being adapted to move about a pin 33 or the like member rigidly secured to the aggregate.

Fig. 4 illustrates how the bottom or cup formed by the deflecting device can be turned about the pivot 10 by turning the control lever 30. In this way, the gas quantity, gas velocity and direction of flow can be given different values on both sides of the aggregate. This control means which also can be operated in intermediate positions between the operative and inoperative position, may be connected with one or more ailerons or their control mechanisms, for instance in order to have the forces on the ailerons and on the deflecting device cooperate for facilitating the control of the aircraft on the ground. If such a control requirement does not exist, the rods 28 should be omitted and the control lever 30 directly connected to the links 25 at the pivots 27, as shown in Fig. 3a.

In Fig. 3, there is shown that the deflecting device may be provided with guide vanes 34 to facilitate the change of flow of direction of the gases in order to reduce the losses as far as possible. Such guide vanes are retractable by being connected with the edge flaps 17 by links 35.

As illustrated in Fig. 5, the two wall portions are arranged in such a manner that in operative position the rear edges thereof are wholly or partly overlapping each other.

Figs. 6 and 7 illustrate a modification having separate pivots 36 and 37 for the movable wall portions or flaps. The pivot of each flap is located on the other side of the central plane of the aggregate than the main portion of the flap. Due to this arrangement, the angular movement required for closing the outlet at the rear edges 5 of the flaps can be shortened, and the gases can be given a direction of flow located more close to the flying direction. In this embodiment, the plates are advantageously located in different planes and mounted in each of the fixed walls 20 and 21 surrounding the plates 8 (Fig. 7).

Fig. 8 shows diagrammatically in what manner the deflecting device may be furnished with two turnable or displaceable wall portions or main flaps 2 and throttling devices mounted on said main flaps and each consisting of one or more wall portions 38 adapted to be rotated or displaced backwardly and inwardly in such a manner that in the outward or operative position of the main flaps 2, the wall portions 38 will tightly meet or overlap each other in the position indicated at 38b in dash and dot lines. In intermediate positions 38a of the throttling flaps the degree of throttling or the output of the jet propulsion unit is controlled without necessity of putting the braking deflecting device proper into operative position.

The main deflector flaps 2 and wall portions 38 constituting the throttling flaps are mounted for rotation about a common pivot 10. The throttle flaps may be separately mounted in the plates of main flaps particularly at the rear edge thereof as illustrated in Figs. 1 and 9. In Fig. 9 the throttle flap 38' is journalled by pins 40 each having a lever 41 secured thereto. The other end of the lever is connected with a wire 42 carried slidably through a hole in the pivot 10 of the main flap. A spring 43 is connected between the lever 41 and a projection 44 and tends to swing the lever 41 to open the throttle flap 38'. Throttling is effected by pulling the wire 42 to turn flap 38' inwards against the action of spring 43.

Fig. 10 shows how the inner superatmospheric pressure in the outlet passage can be utilized to counteract the swinging out movement of the flaps. The resultant R of the gas pressure on the parts of the deflecting device which in retracted position constitute an inner wall of the aggregate, results in a moment about the pivot 10, said moment acting opposite to the swinging movement necessary for putting the flaps into operative position. In other words the pivot 10 is located ahead of the pressure centre on the flap.

According to Fig. 11, the invention is applied to a structure in which two or more aggregates are provided side by side in common plane and in which the deflecting devices are adapted to guide the gases parallel to said plane in such a way that approximately half of the gases will flow out forwardly or substantially forwardly on either side of the two outermost aggregates. In Fig. 11, reference numeral 39 consequently represents one or more units or aggregates. Fig. 11 also illustrates a stream line shaped member 50 arranged between the two aggregates or between the two innermost aggregates and extending rearwardly of the normal outlet nozzle 3 of the aggregates. The walls 51 which are substantially located at right angles to the plane of the aggregate system, form portions of the inner walls of the outlet passages in the retracted positions of the deflecting devices. One half of Fig. 11 on either side of the symmetrical plane may also represent an aggregate which is located close to an outer wall 50 or the like of the aircraft, for instance a portion of a wing or of the fuselage, said outer wall extending rearward of the normal outlet nozzle of the aggregate and in a similar manner forming part of the outlet passage in the deflecting position of the deflecting device. Fig. 11 further illustrates a recess 52 in the wall of the aircraft for obtaining an efficient sealing for the plates or caps. According to Fig. 11, the pivots 10 are located on the same sides of the central plane as the appertaining flaps. The pivots may, however, be located on the opposite sides of the central plane similarly to Fig. 6 or even in the central plane and may, in the latter case, be common for both deflecting devices.

Fig. 12 shows diagrammatically that the deflecting device may be locked in an intermediate position such that the gases can flow out rearward as well as forward. The different gas jets may be chosen such that a slight reactive force only or no reactive force at all is obtained so that the aggregate can be speeded up prior to the take-off of the aircraft. To the same end, the deflecting device may be adapted to divide the gases into two jets having opposite directions, for instance laterally of the aircraft.

The various mechanical or kinetic problems of construction arising in the realization of the invention are assumed to be solved in any of the manners well known in the art, for instance in constructions of control means for aircraft engines, retractable landing gears, control means and locking means for aircraft and wing flaps etc.

What I claim is:

1. A jet propulsion unit for aircraft comprising in a housing means to generate combustion gases for the jet propulsion, an outlet passage permitting the gases to flow and escape rearward, a deflecting device adapted to be moved into the path of the gases flowing through the passage to deflect the flow of gases between said deflecting device and an edge of the housing for reducing the jet propulsion, an adjustable and retractable protecting member mounted at said edge and adapted, in its extending position, to prevent the reaction gases from flowing along the outside of the unit, when the deflecting device is in its deflecting position.

2. A jet propulsion unit for aircraft as claimed in claim 1 in which the protecting member comprises a flap pivoted to the edge of the housing to be adjustable to positions in which it more or less throttles the gases escaping between the flap and the deflecting device in the deflecting position.

3. A jet propulsion unit for aircraft comprising means to conduct combustion gases rearward to generate a propulsive force, an adjustable device for deflecting, in a deflecting position, the gases to reduce said force at will, a protecting member for preventing the gases from flowing along the outer wall of the unit when the deflecting device takes its deflecting position, and means to connect the protecting member with the deflecting device so as to move the protecting member positively in dependence upon movement of the deflecting device.

4. A jet propulsion unit for aircraft comprising means to conduct reaction gases rearward to generate a propulsive force directed forward, an adjustable deflector for deflecting the gases to reduce said force at will, said deflector comprising two opposite plates pivoted to the unit and a cap formed integrally with said plates and situated therebetween, a protecting flap for preventing the gases from flowing along the outer side of the unit in immediate contact therewith, bolts mounted on said flap and engaging slots in said plates, said slots being formed so as to cause the flap to move to a desired extended position when the deflector takes a deflecting position.

5. A jet propulsion unit for aircraft comprising means to conduct combustion gases rearward to generate a propulsive force, an adjustable device for deflecting, in a deflecting position, the gases to reduce said force at will, a protecting member for preventing the gases from flowing along the outer wall of the unit when the deflecting device takes its deflecting position, and means to move the protecting member to a protecting position simultaneously with movement of said deflecting device to its deflecting position.

6. A jet propulsion unit for aircraft as claimed in claim 5 and in which the means moving the protecting member comprises a spring which is adapted to move the protecting member to its protecting position when the deflecting device is moved to its deflecting position.

7. A jet propulsion unit for aircraft, comprising an outlet passage for propulsing combustion gases, a fixed wall, a movable deflector forming an inner wall of the rear portion of said outlet passage in a retracted position and adapted to be moved to a deflecting position to deflect the gases for reduction of the propulsive effect of the combustion gases, the rear edge of the fixed wall situated ahead of portions of the deflector which in the retracted position forms part of the inner wall of the outlet passage being straight and parallel and protecting members in the form of flaps pivoted to the straight edge of the fixed wall to protect the outer wall of the unit from the deflected gases.

8. A jet propulsion unit for aircraft comprising an outlet passage for conducting combustion gases rearward to generate a propulsive force, and an adjustable device permitting the gases to flow through said passage in a normal retracted position of said device but deflecting the gases in an extended position through lateral passages to reduce the propulsive force, and guide vanes in said passages adapted to assist the deflecting device to deflect the gases from the normal outlet passage laterally and substantially forward.

9. A jet propulsion unit for aircraft comprising in combination with means to generate combustion gases for the jet propulsion and an outlet tube permitting the gases to escape rearward, deflectors adjustable in a common plane, and means to move said deflectors to a deflecting position to deflect the gases for reduction of the propulsive effect, said means comprising a control lever swingable in a plane parallel with the plane in which the deflectors are adjustable, a rod for each deflector articulated to said lever, and two arms to which the rods are pivoted and which are connected with each other at the inner ends and have their outer ends connected to pivots at the deflectors, and a stop member for the arms in the extended position of the deflectors said stop member being situated so that the arms have passed somewhat beyond a straight line between their pivots at the deflectors when they engage said stop member.

BO KLAS OSKAR LUNDBERG.

REFERENCES CITED

The following references are of record in the file of this patent:

UNITED STATES PATENTS

| Number | Name | Date |
|---|---|---|
| 1,308,997 | Simmons | July 8, 1919 |
| 1,344,518 | Rees | June 22, 1920 |
| 1,493,280 | Rees | May 6, 1924 |
| 1,572,812 | Rees | Feb. 9, 1926 |
| 1,779,168 | Isom | Oct. 21, 1930 |
| 2,024,274 | Campini | Dec. 17, 1935 |
| 2,402,065 | Martin | June 11, 1946 |

FOREIGN PATENTS

| Number | Country | Date |
|---|---|---|
| 14,631 | Great Britain | July 15, 1905 |
| 171,600 | Great Britain | Nov. 24, 1921 |